United States Patent

[11] 3,634,882

[72] Inventor Malcolm D. McIlroy
Newark, N.J.
[21] Appl. No. 417,973
[22] Filed Dec. 14, 1964
[45] Patented Jan. 11, 1972
[73] Assignee Bell Telephone Laboratories, Incorporated
New York, N.Y.

[54] MACHINE-PROCESSING OF SYMBOLIC DATA CONSTITUENTS
10 Claims, 4 Drawing Figs.

[52] U.S. Cl. .......... 340/172.5, 444/1
[51] Int. Cl. .......... G06f 9/20
[50] Field of Search .......... 340/172.5; 235/157

[56] References Cited
UNITED STATES PATENTS
3,111,648 11/1963 Marsh et al. .......... 340/172.5

*Primary Examiner*—Raulfe B. Zache
*Attorneys*—R. J. Guenther and William L. Keefauver

ABSTRACT: A digital computer is disclosed which may be programmed to extract an *n*-bit character imbedded in a string of data *y* words in length, using only the address of the first word *w* of the block of words used to store the string of data containing the character and the numerical position *c* of the character within the data string. This is accomplished as follows: during assembly of the program, *w* is converted to the absolute memory address of the location containing the *c*th character; this address is used to read the location contents into the data register; the number *c*, is converted into a shift constant which in conjunction with a shift instruction, activates shift logic causing the contents of the data register to be shifted until the *n* bits of the *c*th character are in the *n* least significant bit positions of the data register; and the contents of the data register is masked leaving only the *n* bits of the *c*th character available in the register.

| REFERENCE NO. | LOCATION FIELD | OPERATION FIELD | VARIABLE/OPERAND FIELD |
|---|---|---|---|
| | | ⋮ | |
| 10 | PTR | MACRO | W,C |
| 11 | | PZE | W+C/6, C*6-C/6*36 |
| 12 | | ENDM | |
| | | ⋮ | |
| 15 | CLACH | MACRO | Y |
| 16 | | CAL* | Y |
| 17 | | LXD | Y,4 |
| 18 | | ARS | 30,4 |
| 19 | | ANA | =Ø77 |
| 20 | | ENDM | |
| | | ⋮ | |
| 25 | | CLACH | Z |
| | | ⋮ | |
| 27 | Z | PTR | A,B |
| 28 | B | EQU | 50 |
| 29 | N | EQU | 10 |
| 30 | A | BSS | N |
| | | ⋮ | |
| 32 | | END | |

FIG. 1

| REFERENCE NO. | LOCATION FIELD | OPERATION FIELD | VARIABLE/OPERAND FIELD |
|---|---|---|---|
| | | ⋮ | |
| 10 | PTR | MACRO | W,C |
| 11 | | PZE | W+C/6, C*6-C/6*36 |
| 12 | | ENDM | |
| | | ⋮ | |
| 15 | CLACH | MACRO | Y |
| 16 | | CAL* | Y |
| 17 | | LXD | Y,4 |
| 18 | | ARS | 30,4 |
| 19 | | ANA | =Ø77 |
| 20 | | ENDM | |
| | | ⋮ | |
| 25 | | CLACH | Z |
| | | ⋮ | |
| 27 | Z | PTR | A,B |
| 28 | B | EQU | 50 |
| 29 | N | EQU | 10 |
| 30 | A | BSS | N |
| | | ⋮ | |
| 32 | | END | |

FIG. 2

| MEMORY LOCATION | CONTENTS OF INDICATED MEMORY LOCATION |
|---|---|
| 120 | CAL* 200 |
| 121 | LXD 200,4 |
| 122 | ARS 30,4 |
| 123 | ANA 300 |
| | ⋮ |
| 200 | PZE 458,12 |
| | ⋮ |
| 300 | ØCT 000000000077 |
| | ⋮ |
| 450 | $C_0$ $C_1$··· ···$C_5$ |
| 451 | $C_6$··· ···$C_{11}$ |
| | ⋮ |
| 458 | $C_{48}$···$C_{50}$···$C_{53}$ |
| 459 | $C_{54}$··· ···$C_{59}$ |
| | ⋮ |

INVENTOR
M. D. McILROY
BY G. E. Kirey
ATTORNEY

FIG. 3

| REFERENCE NO. | LOCATION NO. | OPERATION FIELD | VARIABLE/OPERAND FIELD |
|---|---|---|---|
| 40 | | ENTRY | CLACH |
| 41 | CLACH | CLA | 2, 4 |
| 42 | | LRS | 35 |
| 43 | | DVP | SIX |
| 44 | | XCA | |
| 45 | | STA | Y |
| 46 | | MPY | SIX |
| 47 | | MPY | SIX |
| 48 | | LLS | 53 |
| 49 | | STD | Y |
| 50 | | CLA | Y |
| 51 | | ADD | 1, 4 |
| | | ⋮ | |
| | | ⋮ | |
| 60 | Y | PZE | |
| 61 | C | PZE | |
| 62 | SIX | PZE | 6 |
| | | ⋮ | |
| 70 | | CAL * | Y |
| 71 | | LXD | Y, 2 |
| 72 | | ARS | 30, 2 |
| 73 | | ANA | = Ø77 |
| | | ⋮ | |
| 80 | | TRA | 3, 4 |
| | | | |

MACHINE-PROCESSING OF SYMBOLIC DATA CONSTITUENTS

This invention relates to the processing of information by machine and more particularly to the the processing of information constituents.

In a general sense information can be represented by sequences of characters which are said to constitute symbolic strings. The individual characters may be numeric, alphabetic or they may be arbitrary symbols. As a preliminary to processing they are converted into code signals and stored.

The processing follows a prescribed operational sequence. For some machines the sequence is fixed, but in others it is specified by a user. Machines of the latter type are designed with a capability for performing basic operations which can be combined in a variety of ways to produce the desired sequence. The suitability and efficiency of any such sequence depends to a large extent upon the ingenuity exercised in selecting and specifying is constituent operations.

The various operations and their combinations, like the information to be processed, can also be specified by symbolic codes. There are two kinds of symbolic codes: (1) basic operation codes which are translated directly into machine code signals and (2) pseudo operation codes which are translated indirectly or are used to direct the translational process.

Where it is desired to represent a sequence of operations as if the sequence itself were a basic operation, so-called pseudo operations are employed. Each such sequence forms either an immediate or a remote subprogram. Immediate subprograms are inserted into the mainstream of a processing task and are initially symbolized by the pseudo operation MACRO. Remote subprograms, commonly designated as subroutines, are those to which the mainstream of processing is temporarily diverted, to a set of memory storage locations designated by the pseudo operation ENTRY.

A detailed discussion of symbolic codes and subprograms is to be found in *An Introduction to Symbolic Programming*, by P. Wegner, Charles Griffin and Co., Ltd., London, 1963.

Before signals representing operations can act upon signals representing data, the latter must be extracted from storage. The required storage for symbolic data can range from that needed by a single character to that required by an extensive string of characters. The various locations in storage have capabilities which only incidentally meet the data requirements. Thus a string of data may not completely occupy all of the storage allocated to it. Or in the interest of making maximum use of storage the data may be packed so that one string of data adjoins another string of data at an intermediate point in storage. Under these circumstances, it becomes difficult to identify the beginning and terminal positions of data strings and the position of individual characters imbedded within a stored string.

Accordingly, it is an object of the invention to facilitate the processing of constituent characters in strings of symbolic information.

A related object is to identify, extract, and manipulate signals representing an intermediate character in symbolic strings of information.

Another object is to identify the precise location in the memory where the desired symbolic string either commences or ends, while allowing the memory to be used to full capacity without having any subordinate portions which are not fully utilized for storage.

Still another object is to enhance the manipulation rate of symbolic data strings by information-processing machines.

In accomplishing the foregoing and related objects, the invention provides for indirect addressing through a set of pointer signals, in order to extract signals representing individual characters imbedded in a stored symbolic string of information. Indirect addressing means that the signals to be extracted commence at a memory location, i.e., address, which is specified by the contents of the memory locations reserved for the pointer signals.

Each pointer has two constituents, a first set of signals specifying a principal storage location and a second set of signals specifying a subordinate or cell location within the principal location. The principal location is that of an intermediate word of a symbolic string location, derived with respect to the beginning location of the string. The subordinate location indicates the beginning storage position of a prescribed character, derived with respect to the designation of the character within the string.

When a character is to be extracted from storage, reference is had to the pointer to determine the region of the memory where the word containing it is stored. Further resort is made to the pointer to isolate signals of the desired character from signals of other characters at the word location.

According to a feature of the invention, the translation of the symbolic pointer into machine code signals entails the conversion of information specifying the beginning location of a string and the desired character of the string into signals which specify the memory location within which the desired character signals are to be found.

The foregoing operations can be expressed symbolically by a user of the IBM 7090 Data Processing System in terms of two macro operations, the first of which specifies the pointer and the second of which specifies the operation to be undertaken upon signals representing a prescribed character.

The first macro is designated PTR for Pointer. The arguments of the PTR-macro are the beginning position of a symbolic string and the designation of the desired character within the string. During translation the pointer macro produces signals which specify a reference location of the desired character and the relative position of the character within the reference location. In the case of a binary machine, the latter is the bit position of the desired character.

The second macro is designated *xxx*CH where the prefix *xxx* indicates the particular character operation to be undertaken. A basic character operation is that of extracting the desired character from storage and entering it into a register for subsequent processing. This operation is designated CLACH-macro for Clear and Add Character.

In all cases the second macro includes an indirect addressing instruction. In the CLACH character operation the indirect address instruction is CAL* for Clear and Add Logical with the * signifying indirect addressing.

As an alternative to the employment of macro pseudo operations, a subroutine can be employed. The first portion of the subroutine converts its arguments into signals specifying the bit position of the desired character. The second portion of the subroutine accomplishes the desired indirect addressing.

Other aspects of the invention will become apparent after considering an illustrative embodiment in conjunction with the figures in which:

FIG. 1 is a listing of user-specified operations by which data processing is accomplished in accordance with the invention;

FIG. 2 is a memory storage diagram associated with the user-specified listing of FIG. 1;

FIG. 3 is an alternative listing of user-specified operations in accordance with the invention.

Figure 4:
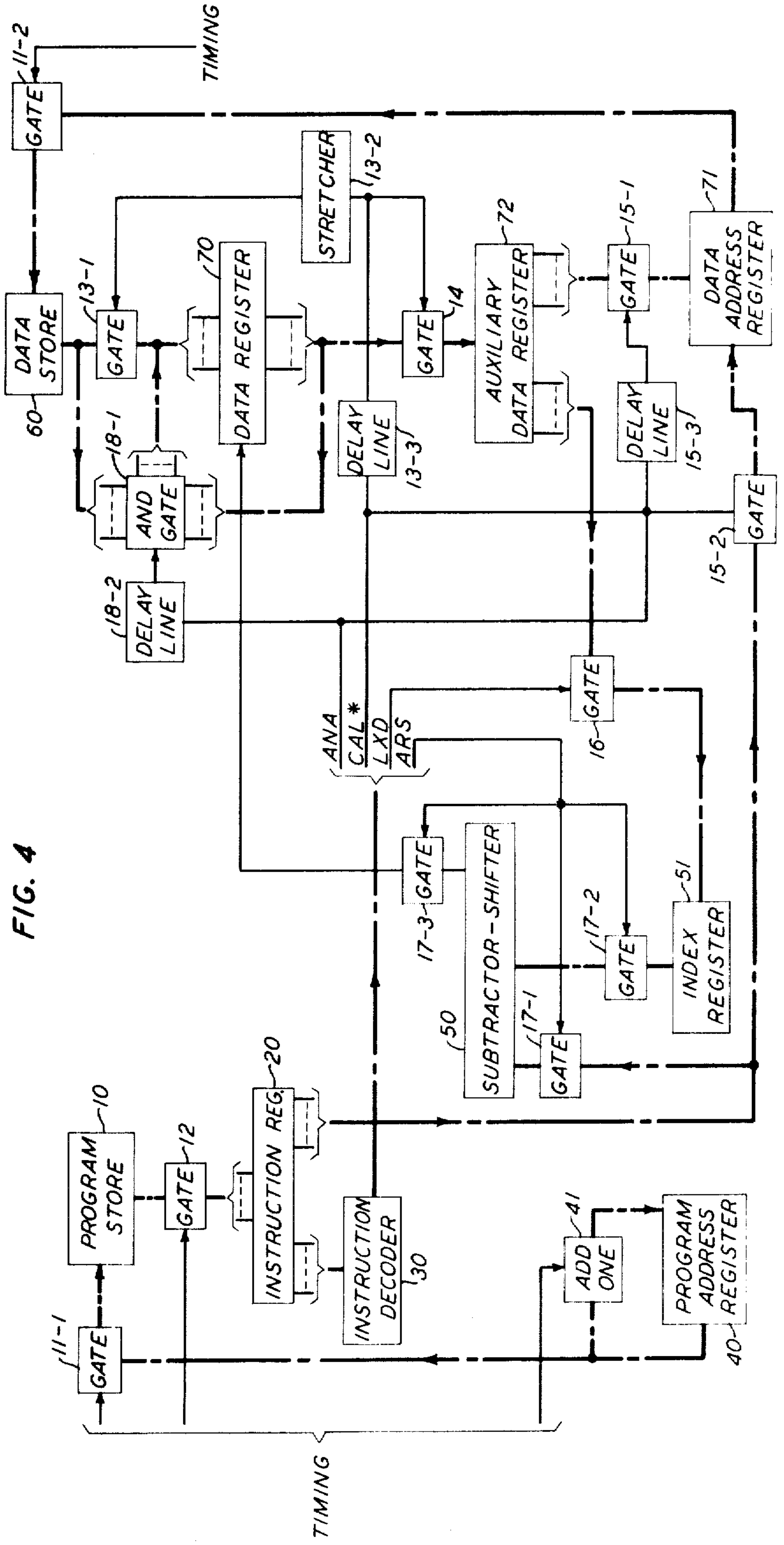
FIG. 4 is a block diagram associated with the listings of FIGS. 1 and 3.

With reference to FIG. 1, the listing shown there sets forth user-specified operations by which signals representing an intermediate character of a symbolic string can be extracted from storage.

Each line of the listing is composed of characters entered, for example, on a punched card. The dots on the listing serve to indicate that other instructions can be interspersed between the blocks of instructions that are set forth in detail. For the purpose of describing the present invention the interspersed instructions are immaterial.

Disregarding the reference numbers, there are up to three distinctive fields of contiguous characters for each instruction. Some of the fields are blank for some of the instructions, but there is an operational entry in the operation field for each instruction.

The operation field contains the symbolic counterpart of signals which prescribe either basic machine operations, or, in the case of the macro instructions, operations that are defined by the user. The symbolic designation of the various user-specified operations are fully described in IBM Form C 28-6235-1 dated May, 1963 and entitled IBM 7090/7094 *Programming Systems Fortran II Assembly Program* (*FAP*).

The upper portion of the listing, encompassing reference Nos. 10–20, is devoted to the definition of two macro operations respectively designated PTR and CLACH. The lower portion of the listing contains calls at reference Nos. 25 and 27, to the foregoing macro definitions. For the purpose of illustration, it has been assumed that the 51st character of a symbolic string of 6 characters is to be manipulated. Such a string is represented symbolically as $C_0C_1 \ldots C_{50} \ldots C_{59}$, the 51st character being $C_{50}$. In storage, each character is represented by six binary signals. Consequently, the entire string requires 10 machine words. Appropriate parameters for the illustrative string are established by the instructions at reference Nos. 28 through 30 in the listing of FIG. 1.

As a preliminary to the processing of data, the symbolic instructions of FIG. 1 are translated into machine code signals by a process that is commonly designated as "assembly." The mechanics of assembly are presented generally in *An Introduction to Symbolic Programming*, supra. Following assembly, the memory of the machine is loaded as illustratively set forth in FIG. 2. The contents of the various memory locations are in binary signal form, but are shown symbolically for clarity.

The call to the CLACH macro at reference No. 25 of FIG. 1 produces the coding loaded into the machine at memory locations 120 through 123 of FIG. 2. The call to the PTR-macro at reference No. 27 of FIG. 1 is made with arguments A and 50, A being the beginning location of the string and 50 being the designation of the desired character. During assembly the argument A is assigned a representative value of 450, which, together with the argument 50, is converted by the assembly of the PTR-macro into a location 458 and a relative position 12 and stored at memory location 200 of FIG. 2. The converted arguments indicate that the desired character is in the 12th bit position of the eighth location with respect to the beginning of the string.

The information at memory location 300 of FIG. 2 results from the assembly of the instruction at reference No. 19 of FIG. 1. The stored symbolic string $C_0C_1 \ldots C_{50} \ldots C_{59}$ commences at storage location 450 of FIG. 2 and terminates at location 459.

When the operations at reference No. 25 of FIG. 1 are performed, the CAL* instruction at memory location 120 of FIG. 2 causes the accumulator of the machine to be loaded with the contents of the memory at location 458 of FIG. 2. The LXD instruction at reference No. 17 of FIG. 1 and memory location 121 of FIG. 2 causes index register 4 to be loaded with the decremental quantity 12 from location 200 of FIG. 2. Hence on the execution of the ARS instruction at reference No. 18 of FIG. 1 and memory location 122 of FIG. 2 the contents of the accumulator are shifted to the right by 18 bits, i.e., the difference between the indicated shift of 30 and the contents of index register 4. Consequently, the 50th character of the string now occupies the six right-hand bits of the accumulator. The final instruction ANA at reference No. 19 of FIG. 1 and memory location 123 of FIG. 2 masks the contents of the accumulator with respect to the contents of location 300 so that the final content of the accumulator consists entirely of the six bits representing the 50th character as desired.

In effect, the macro operations of FIG. 1 insert macro definitional signal sequences into the stream of processing at those points where macro calls are made. The foregoing operations can be achieved alternatively by transferring to a subroutine of the kind set forth in FIG. 3.

The subroutine of FIG. 3 is called by a symbolic instruction of the form CALL CLACH, W, C. This assembles into the following sequence:

TSX CLACH, 4
PZE W

PZE C

When called, the first portion of the subroutine at reference Nos. 41 through 51 derives arguments for internal symbolic location Y at reference No. 60. This is equivalent of the contents of storage location 200 of FIG. 2. Subsequently, the final portion of the subroutine of FIG. 3, at reference Nos. 70 through 73 produces results comparable to those of the instruction at reference Nos. 10 through 20 of FIG. 1. The final instruction at reference No. 80 of FIG. 3 returns the processing to the main program.

The data processing operations of reference Nos. 16 through 19 of FIG. 1 and reference Nos. 70 through 73 of FIG. 3 also give rise to the kind of data processing system shown in FIG. 4.

In FIG. 4, a Program Store 10, operating through an Instruction Register 20 and a Decoder 30, serves as a source of instructions for manipulating data that originated in a Data Store 60 and are entered into a Data Register 70. The Program Store 10 and the Data Store 60 are shown separately for convenience, but they are combined into a single unit.

Before an instruction can be executed, it is extracted from storage using a Program Address Register 40 whose coded output gives the location of the instruction in the Program Store 10. Coded signals forming the address of the desired instruction are dispatched in parallel through a Gate 11 to the store, after which the instruction enters the instruction register through another Gate 12. The address corresponds to the location field of the listings in FIGS. 1 and 3, and the memory location of FIG. 2. Both gates are enabled in conventional fashion from a timing network (not shown). The instruction entering the Register 20 has two portions, corresponding to the operation and operand fields, respectively. The operation field is translated by the Decoder 30 to energize distinctive output terminals. Generally the outputs of the Decoder 30 enables various gates. For the embodiment of FIG. 4, the Decoder 30 enables the following gates:

Gate 13–1 of the Data Register 70 through Pulse Stretcher 13–2 and Delay Line 13–3; Gate 14 of an Auxiliary Register 72; Gates 15–1 and 15–2 of a Data Address Register 71; Gate 16 of an Index Register 51; Gates 17–1 and 17–2 of a Subtracter-Shifter 50; and AND-Gate 18–1 of the Data Register 70 through Delay Line 18–2.

Referring also to FIG. 2, when the Program Address Register 40 of FIG. 4 reaches a count of 120, the operation signals at that location enter the Instruction Register 20 and are decoded. The address portion 200 of the CAL instruction at location 120 is gated into the Data Address Register 71, following which the contents of the Data Store 60 at location 200 enter the Data Register 70 and then the Auxiliary Register 72. Because the CAL instruction at location 120 entails indirect addressing, the address portion of the contents of the Auxiliary Register 72 enters the Address Register 71, causing the contents of location 458 to enter the Data Register 70. The Pulse Stretcher 13–2 is proportional to hold Gate 13–1 open for a sufficient period.

On the next instruction LXD at location 121 of FIG. 2 the decrement of the Auxiliary Data Register 72 is gated into the Index Register 51. On the following instruction ARS at location 122 of FIG. 2 the address field of the instruction is gated into the Subtracter-Shifter 50 and subtracted from the contents of Index Register 50. There is resulting shifting of the contents of the Data Register 70 to the right by 18 bits.

Finally the ANA instruction at location 123 produces a signal "And" at AND-Gate 18–1 of the contents of the Data Register with the signals at storage location 300. The result is a placement of the prescribed character, which had been imbedded in a stored symbolic string, in the rightmost six-bit positions of the Data Register 70 from which it is subject to further manipulation as desired.

Other adaptations of the invention will be apparent to those skilled in the art.

What is claimed is

1. The method of processing information which comprises the steps of 1. generating signals specifying a set of locations in memory, 2. generating signals for indirectly addressing said memory,
3. generating signals for combining the signals generated in steps (1) and (2) in a selected relationship to indirectly address said memory with respect to the signals generated by step (1),
4. combining the signals of steps (1) and (2) in accordance with the signals of step (3), and
5. extracting signals from the memory locations addressed by the combination of signals obtained in step (4).

2. The method as defined in claim 1 wherein the signals of step (1) specify principal and subordinate locations of said memory, and the combination of signals obtained in step (4) indirectly address said memory with respect to the signals of step (1) specifying a principal location.

3. The method as defined in claim 2 wherein the signals extracted according to step (5) are extracted by the combination of signals obtained in step (4) specifying a subordinate location of said memory.

4. The method as defined in claim 2, wherein the signals of step (1) represent a word location and a bit position and are derived from signals representing a block location and a character designation within said block.

5. The method as defined in claim 4, further including the step of 6. shifting the extracted signals according to the bit position signals generated by step (1).

6. The method of processing information which comprises the steps of 1. generating electrical signals including (a) a first set of electrical signals designating a principal location in a memory and (b) a second set of electrical signals designating a subordinate location with respect to said principal location,
2. addressing a third set of electrical signals in said memory according to the electrical signals of said first set,
3. extracting the electrical signals of said third set, and
4. shifting the extracted electrical signals according to the signals of said second set.

7. The machine method of processing signals representing a string of characters stored in a memory which comprises the steps of 1. indirectly addressing said memory to extract signals representing a plurality of characters of said string,
2. shifting the extracted signals until those representing a desired character occupy a preassigned set of positions in a shift register, and
3. masking the remainder of the shifted signals.

8. Apparatus for processing signals representing a string of characters stored in a memory, which apparatus comprises means for indirectly addressing said memory to extract signals representing a plurality of characters of said string, means for shifting the extracted signals until those representing a desired character occupy a preassigned set of positions in a shift register, and means for masking the remainder of the shifted signals.

9. The machine method of processing signals stored in a memory which comprises the steps of 1. extracting signals, representing a plurality of characters, from said memory according to an address specified by a first portion of preassigned set of stored signals,
2. loading an index register with signals constituting a second portion of said preassigned set of stored signals,
3. shifting the extracted signals according to said signals constituting said second portion until the signals representing a desired character occupy a preassigned set of positions in a storage register, and
4. masking the extracted signals except for those representing said desired characters.

10. Apparatus for processing signals stored in a memory which comprises means for extracting signals, representing a plurality of characters, from said memory according to an address specified by a first portion of a preassigned set of stored signals, means for loading an index register with signals constituting a second portion of said preassigned set of stored signals, means for shifting the extracted signals according to said signals constituting said second portion until the signals representing a desired character occupy a preassigned set of positions in a storage register, and means for masking the extracted signals except for those representing said desired characters.

* * * * *

UNITED STATES PATENT OFFICE
CERTIFICATE OF CORRECTION

Patent No. 3,634,882 Dated January 11, 1972

Inventor(s) Malcolm D. McIlroy

It is certified that error appears in the above-identified patent and that said Letters Patent are hereby corrected as shown below:

Column 1, line 18, "is" should read --its--; line 43, "capabilities" should read --capacities--. Column 3, line 14, "6" should read --60--; line 72, after "following" insert --calling--. Column 4, line 20, "are" should read --may be--; line 64, "signal" should read --logical--. Column 6, line 19, before "preassigned" insert --a--.

Signed and sealed this 11th day of July 1972.

(SEAL)
Attest:

EDWARD M.FLETCHER,JR.
Attesting Officer

ROBERT GOTTSCHALK
Commissioner of Patents

RM PO-1050 (10-69)

USCOMM-DC 60376-P69
* U.S. GOVERNMENT PRINTING OFFICE 1969 O—366-334